United States Patent
Acharya (10) Patent No.: US 12,536,189 B1
(45) Date of Patent: Jan. 27, 2026

(54) METADATA DRIVEN DATA PROCESSING PIPELINES

(71) Applicant: Honeywell International Inc., Charlotte, NC (US)

(72) Inventor: Bhabesh Acharya, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/741,848

(22) Filed: Jun. 13, 2024

(51) Int. Cl.
  *G06F 16/00* (2019.01)
  *G06F 16/25* (2019.01)

(52) U.S. Cl.
  CPC .................. *G06F 16/254* (2019.01)

(58) Field of Classification Search
  CPC ..................................................... G06F 16/254
  USPC ........................................................ 707/602
  See application file for complete search history.

(56) References Cited

U.S. PATENT DOCUMENTS

| | | | | |
|---|---|---|---|---|
| 9,910,903 | B1* | 3/2018 | Jilani | G06F 16/254 707/707 |
| 11,921,737 | B2* | 3/2024 | Natani | G06F 16/245 707/707 |
| 2018/0061500 | A1* | 3/2018 | Hioka | G11C 16/0483 707/707 |
| 2020/0233905 | A1* | 7/2020 | Williams | G06F 16/904 707/707 |
| 2023/0086750 | A1* | 3/2023 | Battistoni | G06F 11/328 707/694 |

* cited by examiner

*Primary Examiner* — Alexandria Y Bromell (57) ABSTRACT

Various embodiments described herein relate to systems and methods for processing data received from various data sources in a facility. In this regard, an input is received corresponding to at least one change in one or more assets. Configuration data associated with the one or more assets is updated based on the at least one change. Further, the updated configuration data is persisted at one or more data loaders. At least one Extract Transform Load (ETL) process is triggered corresponding to the updated configuration data to generate one or more aggregates associated with the one or more assets. As a result, Key Performance Indicator (KPI) metrics associated with the one or more assets is calculated.

14 Claims, 4 Drawing Sheets

METADATA DRIVEN DATA PROCESSING PIPELINES

TECHNICAL FIELD

The present disclosure generally relates to a data processing system. More particularly, the present disclosure relates to data processing pipelines that process data collected from multiple disparate data sources in a facility.

BACKGROUND

Facilities such as warehouse, industry, or business enterprise, include various assets, such as conveyor belts, HVAC components, AHUs, and/or like. These assets require monitoring at regular intervals. In order to make critical business decisions, there is a need to calculate performance or efficiency of the assets in one or more facilities. In this regard, data from multiple disparate sources are collected, stored and organized into a single data repository. The data emanating from multiple data sources may be structured, semi-structured or unstructured and may be in a format different from what is needed in a target data repository. The data processing pipelines aid in normalizing the raw streaming data based on business needs before loading into the single target repository. As large amount of data may be received from different enterprises, the data normalizing requirements vary from asset to asset based on the business requirements of the particular industry. Therefore, there is a need to format and store the data from multiple data sources in a unified data repository to support better decision-making and getting accurate insights related to the performance or efficiency of the assets.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments, in which.

SUMMARY OF THE INVENTION

The details of some embodiments of the subject matter described in this specification are set forth in the accompanying drawings and the description below. Other features, aspects, and advantages of the subject matter will become apparent from the description, the drawings, and the claims.

In accordance with an embodiment of the present disclosure, a system for processing data collected from multiple disparate data sources is described. The system comprises a memory and a processor coupled to the memory. The processor is configured to receive an input corresponding to at least one change in one or more assets, update configuration data based on the at least one change in the one or more assets, wherein the configuration data comprises metadata associated with the one or more assets, persist the updated configuration data at one or more data loaders, and trigger at least one Extract Transform Load (ETL) process corresponding to the updated configuration data to generate one or more aggregates associated with the one or more assets. Further, the processor is configured to calculate Key Performance Indicator (KPI) metrics associated with the one or more assets based on the generated one or more aggregates, and render, via a dashboard visualization, display of the KPI metrics associated with the one or more assets on a display device.

According to an aspect of the present disclosure, a method for processing data collected from multiple disparate data sources is described. The method includes steps of receiving an input corresponding to at least one change in one or more assets, updating configuration data based on the at least one change in the one or more assets, wherein the configuration data comprises metadata associated with the one or more assets, persisting the updated configuration data at one or more data loaders, triggering at least one Extract Transform Load (ETL) process corresponding to the updated configuration data to generate one or more aggregates associated with the one or more assets, calculating Key Performance Indicator (KPI) metrics associated with the one or more assets based on the generated one or more aggregates, and rendering, via a dashboard visualization, display of the KPI metrics associated with the one or more assets on a display device.

The above summary is provided merely for purposes of providing an overview of one or more exemplary embodiments described herein so as to provide a basic understanding of some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which are further explained in the following description and its accompanying drawings.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. Further, one or more embodiments described herein may be combined in any manner to realize the advantages discussed herein.

It is to be understood that both the foregoing general description and the following detailed description are exemplary and explanatory only and are not restrictive of the disclosed embodiments, as claimed.

DETAILED DESCRIPTION

Reference will now be made in detail to embodiments, examples of which are illustrated in the accompanying drawings. In the following detailed description, numerous specific details are set forth in order to provide a thorough understanding of the described embodiments. However, it will be apparent to one of ordinary skill in the art that the described embodiments may be practiced without these specific details. Well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," according to one embodiment," and the like generally mean that a particular feature, structure, or characteristic following the phrase may be included in at least one embodiment of the present disclosure, and may be included in more than one embodiments of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations. If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

A facility, for example, may generally include physical assets such as sensors, manufacturing equipment, factory equipment, conveyor belts, vehicle components, heating, ventilation and air conditioning (HVAC) components, machines, computing devices, and various other types of assets. Such assets collect and generate different types of data related to processes within the facility. The facility typically manages large amount of data. The data thus obtained from such processes may be output in a raw streaming format. This data from multiple disparate data sources needs to be formatted and stored in a unified data repository to facilitate business intelligence (BI). Some functions of BI technologies include reporting, online analytical processing (OLAP), analytics, data mining, business performance management, text mining, and predictive analytics. One goal of BI is for example, to support better business decision-making. Therefore, tools for BI enable, among other things, dynamic querying of real-time data and historical data.

In many BI applications, data processing pipelines play an important role in cleansing the data before ingesting into the target data repository. The data processing pipelines are essential in managing and transforming data as they move from the source to the target data repository. The data processing pipelines such as the ETL (Extract, Transform, Load) and ELT (Extract, Load, Transform) are the most common types of data processing pipelines. The data processing pipelines may be used as a beneficial tool in the creation and management of efficient and consistent databases, data marts and data warehouses. ETL process is used for extracting raw data from the source, cleansing the data to remove anomalies and formatting the data to make it suitable for business analytics.

Current data warehouse architectures commonly utilize ETL or ELT processes depending on the nature of data, data processing constraints and the goals of the business organization. Typically, the ETL process extract the data in raw format, transform the extracted data based on business needs and load the transformed data into the target system. Transformation or normalization of data, is one of the important phases in the data processing pipelines as normalizing the data ensures enhanced consistency and quality of data, providing business enterprises with actionable insights.

The data processing pipelines such as an ETL pipeline aid in normalizing the raw streaming data based on business needs before loading into the unified target repository. As large amount of data may be received from different enterprises, the data normalizing requirements vary from asset to asset based on the business requirements of the particular industry. For example, each incoming input data to the data processing pipeline may have unique data properties, characteristics and attributes depending upon the asset and/or asset type. While some data formats may be structured, some other data formats may provide semi-structured or unstructured data schemas. Since data formats may vary when processing large amounts of data from disparate data sources, normalization of data from one format to the other format becomes a complex task. For instance, the differences between a source data schema and a target data schema may need to be identified in order to determine the normalization rules that need to be applied to the source data. Further, as new data formats keep evolving, the data processing pipelines need to be updated in order to generate new transformation workflows involving new data formats. Therefore, the data processing pipeline needs to be managed effectively to accommodate varying requirements for each asset and/or enterprise. Further, every facility typically creates its own customized data warehouse or logical data structure that is unique or specific to their organizational needs using well-known relational database management systems (RDBMS). The users or customers of the enterprise (on-premises or in the cloud) may add or use new custom fields in source systems and may want to use the custom fields for reporting metrics in their data warehouse. In such cases, ETL framework and the reporting workflow needs to be modified. As source systems and data warehouses move to the cloud, it would be challenging to add new fields and customize and redeploy the data model, the ETL framework, and reporting workflows in the cloud.

Conventionally, the data processing pipelines are hard coded in many BI applications. The hardcoded pipelines perform data normalization and load operations by means of custom code or logic which may be specific to a user or enterprise. Hardcoded pipelines are thus less flexible for modifications, particularly when there is a new data source, or a new asset is installed or there is a change in data normalization or loading requirements. Therefore, when data from a new source is processed, hardcoded pipelines may tend to become inefficient. Also, the code needs to be to modified or rewritten and tested to adapt to the change in processing requirements thereby resulting in maintenance issues. The data processing pipelines in such cases need to be re-configured for every new customer or user.

Therefore, there is a need to provide a configurable and extensible data processing framework that is flexible and is adaptable to evolving data structures and business requirements, making it easy to add new data sources/data formats and providing seamless integration. A configurable data pipeline may prove to be efficient and useful in normalizing large volumes of data when compared to hardcoded pipelines, as they provide improved scalability, reusability and ease of maintenance.

There is also a need to provide an integrated and comprehensive data processing framework that eliminates the need to re-write or reconfigure the data processing pipelines with new transformation rules and calculations for every new tenant and domain, rather provide a framework that will be useable by multiple tenants or user groups, enabling simplification of the data ingestion pipeline and data management.

Further, in any facility, metrics are collected to assess performance of the one or more assets. The process involves data collection, aggregation, analysis, presentation and tracking actual performance metrics against target metrics. The traditional system keeps on calculating the performance metrics of the one or more assets all the time. These calculations consume lot of power and therefore it is a cost intensive task.

Therefore, there is yet another need to perform asset specific calculations such as the performance metrics calculations "on-demand" during query time or on schedule (instead of being pre-calculated). For instance, the asset specific calculations may be performed at a specific frequency such as every 1 hour, every 6 hours, etc. In another embodiment, the ETL process may be triggered at a specific frequency or "on-demand". This helps avoiding unnecessary calculations and saves power and cost.

Figure 1:
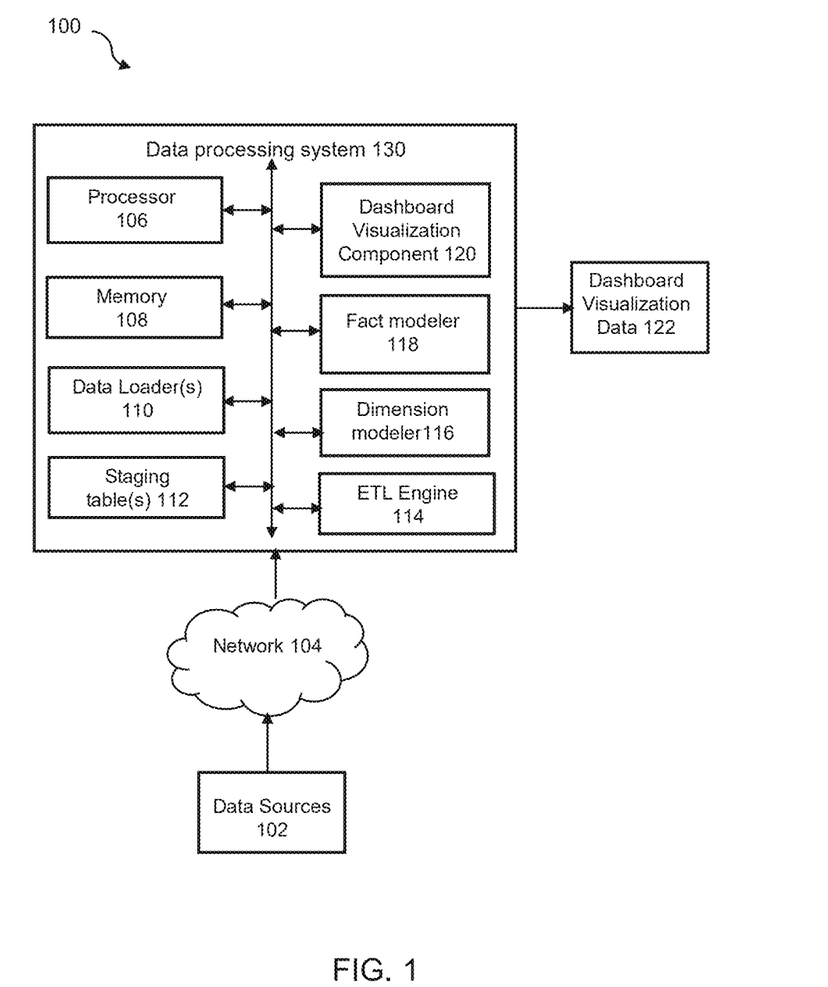
FIG. 1 is an exemplary block diagram 100 illustrating an implementation of a data processing system 130, in accordance with one or more embodiments of the present disclosure.

FIG. 1 is an exemplary block diagram 100 illustrating an implementation of a data processing system 130, in accordance with one or more embodiments of the present disclosure. The data processing system 130 may receive data from one or more data sources 102. For instance, the data processing system 130 receives the data over a network 104. The data sources 102 are disparate data sources. In an embodiment, the one or more data sources 102 may be associated with a tenant, a user group, or a domain. In an embodiment, the data received at the data processing system 130 comprises asset data, operational data, configuration data, worker data, fault data, and/or like. The data processing system 130 may then process the received data.

According to various embodiments, the network 104 is configured to provide communication between various components depicted in FIG. 1. In some embodiments, the network 104 includes a public network (e.g., the Internet). In some other embodiments, the network 104 may be a hybrid network (e.g., a network enabling internal communications between particular connected devices and external communications with other devices). Such configuration(s) include, without limitation, a wired or wireless Personal Area Network (PAN), a Cloud network, Local Area Network (LAN), Metropolitan Area Network (MAN), Wide Area Network (WAN), and/or the like. In various embodiments, the network 104 may include one or more base station(s), relay(s), router(s), switch(es), routing station(s), and/or the like.

In one or more embodiments, the data processing system 130 is implementable via a cloud. The data processing system 130 is related to one or more technologies, such as, for example, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies.

In an embodiment, the data sources 102 may include one or more assets associated with any entity or facility including but not limited to company, building, manufacturing plant, warehouse, real estate facility, laboratory, aircraft, spacecraft, automobile, vehicle, site, premises, or any other type of facility. The data processing system 130 may be configured to receive asset data from the one or more assets. The one or more assets may include, but not limited to, databases, building assets, industrial assets, IoT devices (e.g., industrial IoT devices), connected building assets, sensors, actuators, processors, computers, valves, pumps (e.g., centrifugal pumps, etc.), motors, compressors, turbines, ducts, heaters, chillers, coolers, boilers, furnaces, heat exchangers, fans, blowers, conveyor belts, vehicle components, cameras, displays, security components, air handler units, HVAC components, industrial equipment, factory equipment, and/or other devices that are connected to a network 104 for collecting, sending, and/or receiving information. The asset data includes, for example, connected building data, sensor data, real-time data, live property value data, asset heath data, event data, process data, operational data, fault data, location data, and/or other data associated with the one or more assets. The asset health data may include age of the asset, service history of the asset, etc.

In some embodiments, the data processing system 130 may receive operational data from one or more sensors associated with the one or more assets. The operational data may comprise sensor data or any other data describing operation of the one or more assets. In one or more embodiments, the operational data may define the type of sensors associated with an asset and the type of data that is being sensed by each sensor. For example, the sensor data may comprise data received from one or more heat sensors, gas sensors, humidity sensors, pressure sensors, temperature sensors, and the like. In one example, the sensors may monitor the operation of a residential or commercial building or enterprise (e.g., security systems, building automation systems, and/or the like). In another example, the sensors may monitor the operation of a manufacturing plant (e.g., manufacturing machinery, conveyor belts, and/or the like). In another example, the sensors may monitor the operation of a vehicle.

According to various embodiments, the data processing system 130 may receive sensor readings 202a (illustrated in FIG. 2) from the one or more sensors. In some embodiments, the sensors may be located remotely or in proximity of the assets. The sensors may be utilized to collect data associated with an asset in real-time. In one example, a temperature sensor may include real-time temperature data associated with one or more assets. For example, a thermostat may monitor the temperature of a building environment to control the functions of an installed HVAC system in order to maintain a set temperature within the building environment. Humidity sensors, for example may capture the amount of water vapor in a particular system. Pressure sensors, for example may detect the fluctuations or drops in pressure for systems that include gases and liquids.

Figure 2:
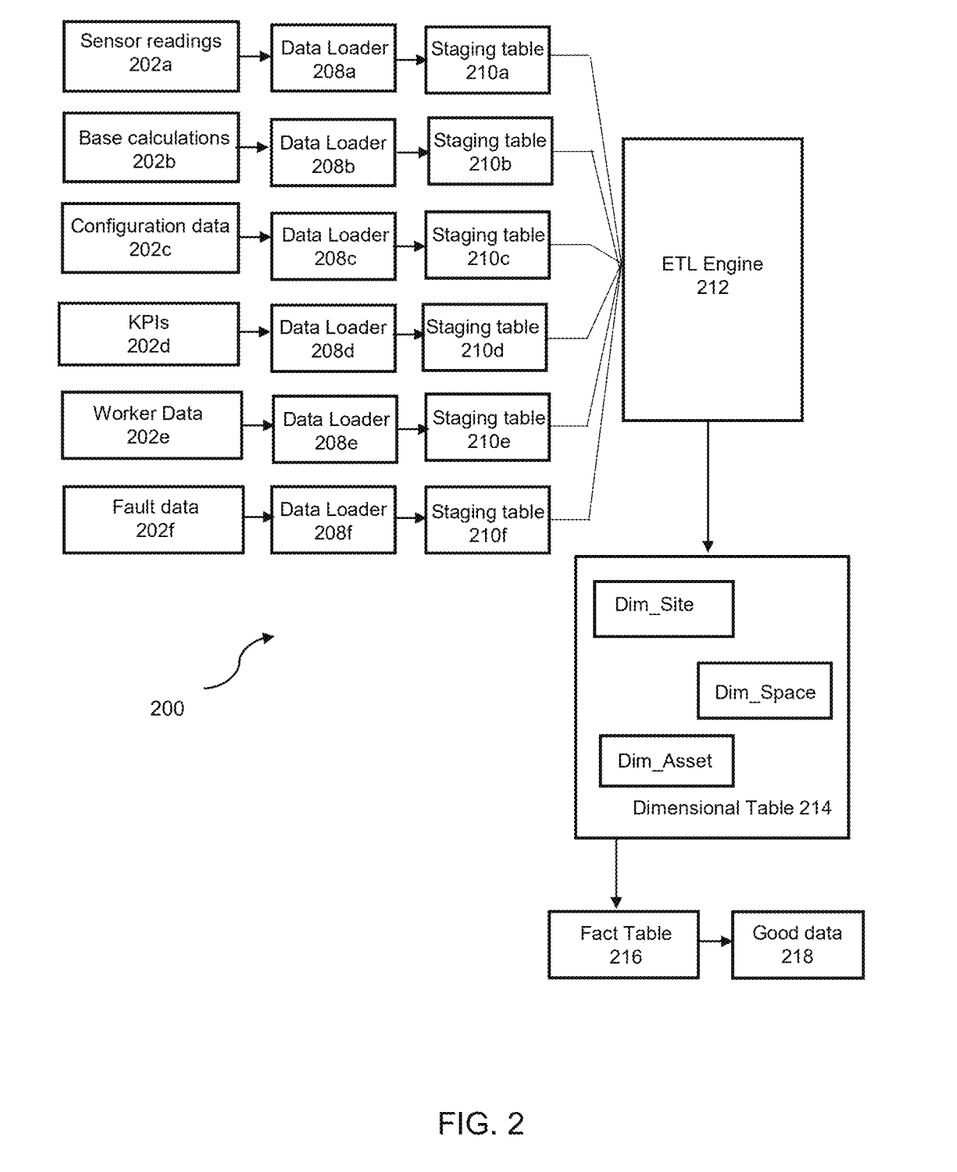
FIG. 2 illustrates an exemplary schematic diagram 200 illustrating populating of a dimensional model, in accordance with one or more embodiments of the present disclosure.

According to various embodiments, the data processing system 130 may receive base calculations or fundamental calculations 202b for different asset types (illustrated in FIG. 2). The base calculations or fundamental calculations 202b include base calculation attributes for different asset types. For example, asset health facts include the base calculation attributes such as uptime base calculations, planned runtime base calculations, total possible output base calculation, successful output base calculation and/or the like. Similarly, worker performance facts include the base calculation attributes such as event count, task count, incident count, actual production time, job function and/or the like.

According to various embodiments, the data processing system 130 may receive configuration data 202c related to the one or more assets (illustrated in FIG. 2). The configuration data 202c may describe the metadata regarding the one or more assets. In certain embodiments, the configuration data 202c may describe parameters, characteristics, attributes, and relationships associated with the one or more assets forming a knowledge graph. In one example, the knowledge graph may be represented as an ontology model providing ontology model data regarding the characteristics of data emanating from the one or more assets. The ontology model data may provide a representation of the one or more assets, classification of the assets into different types, definition of various attributes of the assets, definition of associations/relationships between the various assets, and/or definition of associations/relationships between assets and corresponding facilities. In some embodiments, the configuration data 202c may include the metadata such as identification information (e.g. an identification that uniquely identifies the asset) for individual assets of the facility, type information of the individual assets (e.g. the type of sensor such as a temperature sensor), properties associated with the identification information, locations of the assets (e.g. where exactly the asset is located) within the facility. The configuration data 202c may also define relationships between the assets with respect to each other, relationships between types of the assets with respect to each other, and/or roles of the assets and/or types of assets. The configuration data 202c may thus provide domain-specific awareness in relation to one or more assets and asset types.

According to various embodiments, the data processing system 130 may receive KPI data 202d related to the one or more assets (illustrated in FIG. 2). The KPI data 202d may include performance metric data related to the one or more assets such as, but not limited to, overall equipment efficiency (OEE) of the one or more assets. The KPI data 202d may include worker performance metric data such as task count per site, incident count per site, idle time per job function, and/or the like.

Additionally, the data processing system 130 may receive worker data 202e, fault data 202f, and/or the like (as illustrated in FIG. 2). The worker data 202e may include worker related data such as, but not limited to idle time per worker, schedules, shift timings, certification, skills, etc. The fault data 202f may include fault related data such as, but not limited to frequency, severity level, status, start time, end time, type of fault, fault history, name, description, mode, etc.

In an embodiment, the data such as the sensor readings 202a, the base calculations 202b, the fault data 202f may be received by the data processing system 130 in streaming format in real-time whereas the data such as the configuration data 202c related to the one or more assets, the KPIs 202d, the worker data 202e, etc. may be received in batches at predetermined intervals.

In some embodiments, the configuration data 202c is updated at regular intervals based on one or more changes associated with the one or more assets. The one or more changes may be, but not limited to, addition of new data sources, addition of new assets, modification of existing assets, a change in data formats, a change in the ontology model data, a change in the metadata of one or more assets, etc. The change in the metadata includes a change in identification data, type data, operation data, location data, health data, fault data, sensor data, and/or other data associated with the one or more assets.

The data processing system 130 may comprise one or more components such as, data loader(s) 110, staging table(s) 112, an Extract Transform Load (ETL) engine 114, a Dimension modeler 116, a Fact modeler 118, and/or a Dashboard Visualization Component 120. Additionally, the data processing system 130 includes a processor 106 and/or a memory 108. One or more aspects of the data processing system 130 (and/or other systems, apparatuses and/or processes disclosed herein) constitute executable instructions embodied within a computer-readable storage medium (e.g., the memory 108). For instance, the memory 108 stores computer executable component and/or executable instructions (e.g., program instructions). Furthermore, the processor 106 facilitates execution of the computer executable components and/or the executable instructions (e.g., the program instructions). The processor 106 is configured to execute instructions stored in memory 108 or otherwise accessible to the processor 106.

The processor 106 is a hardware entity (e.g., physically embodied in circuitry) capable of performing operations according to one or more embodiments of the disclosure. Alternatively, in an embodiment where the processor 106 is embodied as an executor of software instructions, the software instructions configure the processor 106 to perform one or more algorithms and/or operations described herein in response to the software instructions being executed. In an embodiment, the processor 106 is a single core processor, a multi-core processor, multiple processors internal to the data processing system 130, a remote processor (e.g., a processor implemented on a server), and/or a virtual machine. In certain embodiments, the processor 106 is in communication with the memory 108, the data loader(s) 110, the staging table(s) 112, the ETL engine 114, the Dimension modeler 116, the Fact modeler 118, and/or the Dashboard Visualization Component 120, via a bus to, for example, facilitate transmission of data among the processor 106, the memory 108, the data loader(s) 110, the staging table(s) 112, the ETL engine 114, the Dimension modeler 116, the Fact modeler 118, and/or the Dashboard Visualization Component 120. The processor 106 may be embodied in a number of different ways and, in certain embodiments, includes one or more processing devices configured to perform independently. Additionally, or alternatively, the processor 106 includes one or more processors configured in tandem via a bus to enable independent execution of instructions, pipelining of data, and/or multi-thread execution of instructions.

The memory 108 is non-transitory and includes, for example, one or more volatile memories and/or one or more non-volatile memories. In other words, in one or more embodiments, the memory 108 is an electronic storage device (e.g., a computer-readable storage medium). The memory 108 is configured to store information, data, content, one or more applications, one or more instructions, or the like, to enable the data processing system 130 to carry out various functions in accordance with one or more embodiments disclosed herein. In accordance with some embodiments described herein, the memory 108 may correspond to an internal or external memory of the data processing system 130. In some embodiments, the memory 108 may correspond to a database communicatively coupled to the data processing system 130. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor circuitry, an executable component, a thread of instructions, a program, and/or a computer entity.

In an embodiment, the processor 106 of the data processing system 130 may be configured to receive an input corresponding to one or more changes in the one or more assets. The one or more changes may be, but not limited to, addition of new data sources, addition of new assets, modification of existing assets, a change in data formats, a change in the ontology model data, a change in the metadata of one or more assets, etc. The change in the metadata includes a change in identification data, type data, operation data, location data, health data, fault data, sensor data, and/or other data associated with the one or more assets.

The processor 106 may be configured to update the configuration data 202c based on the one or more changes in the one or more assets. The processor 106 may be configured to persist or store the data received from the one or more data sources 102 in the data loaders 110 and perform normalization on the received data. In an embodiment, the received data may include the updated configuration data. In some embodiments, the data loader(s) 110 constantly polls and looks at the configuration data 202c associated with the one or more assets and any updates or changes in the configuration data 202c are acquired by the data loader(s) 110. The updated configuration data is stored in the data loader(s) 110. The received data is normalized in the data loaders 110 such that ETL engine 114 would not be burdened with the additional computations.

In an embodiment, the processor 106 may be configured to store the normalized data in the staging table(s) 112 in a specific format. Further, the normalized data is ingested into ETL pipeline. The ETL engine 114 of the data processing system 130 may be configured to trigger at least one ETL process based on the data ingested into the ETL pipeline. The ETL process is triggered "on-demand" or on schedule at a specific frequency based on the updated configuration data. The configuration data 202c may describe the metadata related to the one or more assets. In another embodiment, the ETL process is driven by one or more changes in the metadata. Therefore, the ETL process is driven by the metadata related to the one or more assets. In another embodiment, there may be a plurality of ETL processes that are triggered "on-demand" or on schedule basis. The frequency of execution of the ETL process depends on the requirements of the specific asset and the business needs. In one implementation, the ETL process may be required to run at specific time intervals or on a scheduled basis (e.g. batch processing). In another embodiment, the ETL process may be required to be applied continuously or near-real-time (e.g. stream processing). In another embodiment, a plurality of dimensions is generated based on the ETL process. The plurality of dimensions may be related to asset dimension, space dimension and/or site dimension. The plurality of dimensions includes, but not limited to, space identification data, site identification data, asset type, asset identification data, asset location, site group identification data, etc.

At every run, the dimension modeler 116 may be configured to populate the plurality of dimensions into dimensional tables based on the ETL process. The processor 106 may be configured to calculate one or more aggregates based on the data populated into the dimensional tables. The one or more aggregates may be related to asset heath, asset fault, asset performance, etc. The one or more aggregates related to asset heath may be, but not limited to, system identification data, uptime, planned runtime, actual output, total possible output, successful output, etc. Further, the Fact modeler 118 may be configured to populate the one or more aggregates into a fact table.

In an embodiment, the one or more aggregates such as uptime and/or planned runtime may be used to calculate Availability of a particular asset. The one or more aggregates such as asset actual output and/or total possible output may be used to calculate Performance of the asset. The one or more aggregates such as successful output and/or total possible output may be used to calculate Quality of the asset. Further, the processor 106 is configured to compute KPI metrics such as OEE associated with the asset based on the calculated Availability, Performance, and Quality of the asset. The calculated Availability, Performance, and Quality varies for different assets. In another embodiment, the processor 106 is configured to compute KPI metrics such as worker performance based on task count per site, incident count per site, idle time per job function, and/or the like. These calculations are performed "on-demand" via user query or on schedule basis (instead of being pre-calculated). Likewise, all other calculations could be performed "on-demand" via user query or on schedule basis (instead of being pre-calculated).

In certain embodiments, the dashboard visualization component 120 of the data processing system 130 may be configured to render dashboard visualization of the dashboard visualization data 122 on the display device. In various embodiments, the dashboard visualization facilitates display of aggregation of asset performance data into a score or metric value such as, for example, the KPI metric. In various embodiments, the dashboard visualization additionally or alternatively presents recommendations to improve asset performance based on the one or more aggregates. In one or more embodiments, issues associated with the one or more assets are ordered such that issues with a largest impact with respect to the one or more assets is presented first via the dashboard visualization. Impact may be based on cost to repair an asset, energy consumption associated with issues related to the one or more assets, savings lost associated with issues related to the one or more assets, etc.

FIG. 2 illustrates an exemplary schematic diagram 200 illustrating populating of a dimensional model, in accordance with one or more embodiments of the present disclosure. A plurality of data loaders 208a, 208b, . . . 208f is configured to procure data from various upstream data sources such as the one or more assets. The plurality of data loaders 208a, 208b, . . . 208f also correspond to data loaders 110 as described in FIG. 1 of the current disclosure. The procured data includes the sensor readings 202a, the base calculations 202b, the configuration data 202c related to the one or more assets, the KPIs 202d, the worker data 202e, and/or the fault data 202f (as described in detail with respect to FIG. 1). The data procured from the one or more data sources may be persisted in respective data loaders 208a, 208b, . . . 208f. The procured data may be normalized in the data loaders 110 such that ETL engine 212 would not be burdened with the additional computations. In some embodiments, the data loader 208c constantly polls and looks at the configuration data 202c associated with the one or more assets and any updates or changes in the configuration data 202c are acquired by the data loader 208c. The updated configuration data is stored in the data loader 208c.

In an embodiment, the normalized data may be stored in the respective staging tables 210a, 210b, . . . 210f in a specific format. Further, the normalized data is ingested into the ETL pipeline. The ETL engine 212 may be configured to trigger at least one ETL process based on the data ingested into the ETL pipeline. The ETL process is triggered "on-demand" or on schedule at a specific frequency based on the updated configuration data. The configuration data 202c may describe the metadata related to the one or more assets. In another embodiment, the ETL process is driven by one or more changes in the metadata. Therefore, the ETL process is driven by the metadata related to the one or more assets. In another embodiment, there may be a plurality of ETL processes that are triggered "on-demand" or on schedule basis. The frequency of execution of the ETL process depends on the requirements of the specific asset and the business needs. In one implementation, the ETL process may be required to run at specific time intervals or on a scheduled basis (e.g. batch processing). In another embodiment, the ETL process may be required to be run continuously or near-real-time (e.g. stream processing). In another embodiment, a plurality of dimensions is generated based on the ETL process. The plurality of dimensions may be related to asset dimension, space dimension and/or site dimension. The plurality of dimensions includes, but not limited to, space identification data, site identification data, asset type, asset identification data, asset location, site group identification data, etc.

At every run, the plurality of dimensions is populated into the dimensional table 214 based on the ETL process. Further, one or more aggregates are calculated based on the data populated into the dimensional table 214. Further, the calculated one or more aggregates are populated into the fact table 216. The one or more aggregates may be related to asset heath, asset fault, asset performance, etc. The one or more aggregates related to asset heath include, but not limited to, system identification data, uptime, planned runtime, actual output, total possible output, successful output, etc. In some embodiment, the one or more aggregates are used to calculate good data 218 such as the KPI metric associated with the asset. Similarly, the good data may be calculated for other assets in the facility using similar process.

Figure 3:
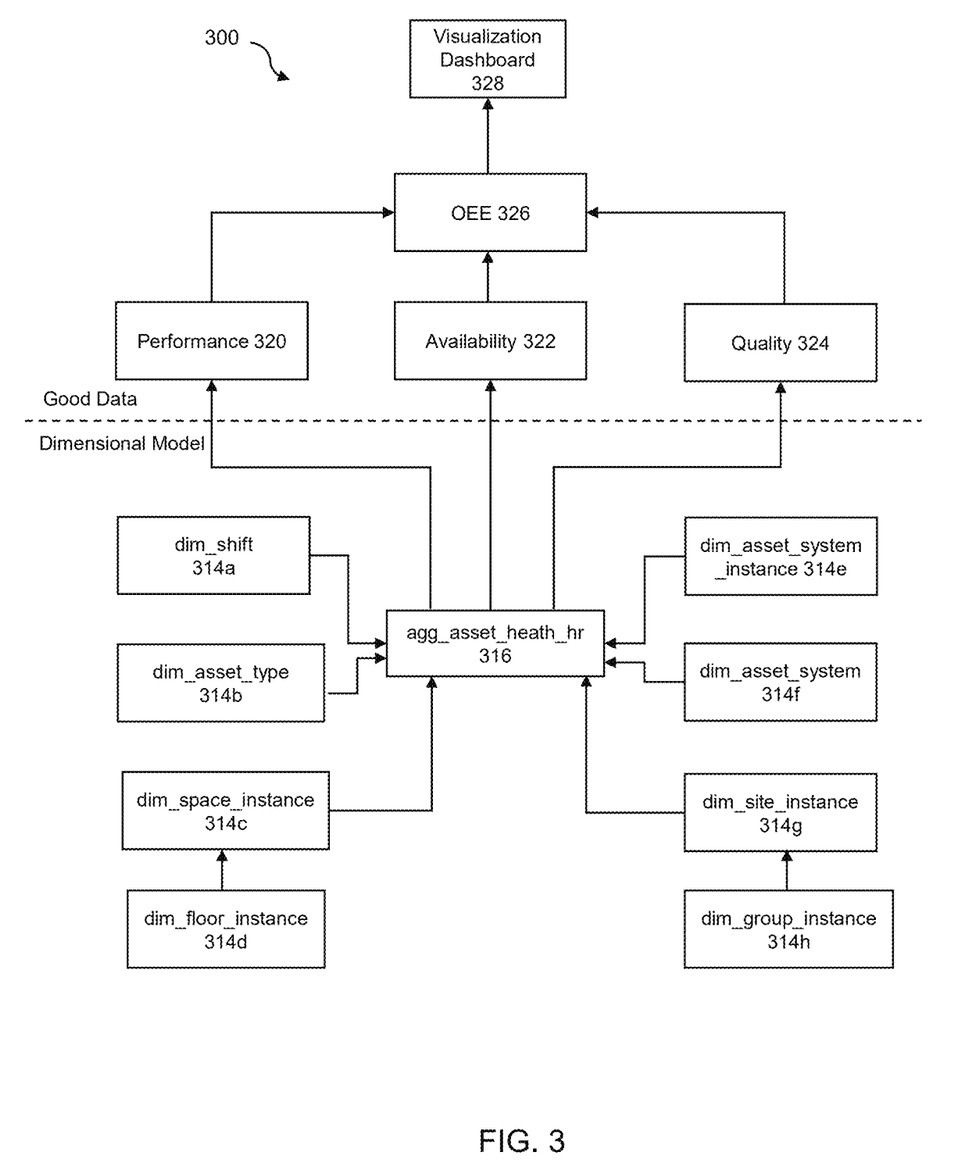
FIG. 3 illustrates an exemplary process 300 of performing base calculations corresponding to an asset in accordance with one or more embodiments of the present disclosure.

FIG. 3 illustrates an exemplary process 300 of performing base calculations corresponding to an asset in accordance with one or more embodiments of the present disclosure. In an embodiment, the base calculations are performed "on-demand" via user query or on schedule basis at the specific frequency (instead of being pre-calculated). The plurality of dimensions such as dim_shift 314a, dim_asset_type 314b, dim_space_instance 314c, dim_floor_instance 314d, dim_asset_system_instance 314e, dim_asset_system 314f, dim_site_instance 314g, and/or dim_group_instance 314h are populated into the dimension table 214. The one or more aggregates such as agg_asset_health_hr 316 related to asset health are calculated based on the plurality of dimensions populated into the dimensional table 214. The one or more aggregates such as asset actual output and/or total possible output may be used to calculate Performance 320 of the asset. The one or more aggregates such as uptime and/or planned runtime may be used to calculate Availability 322 of the particular asset. The one or more aggregates such as successful output and/or total possible output may be used to calculate Quality 324 of the asset. The OEE 326 of the asset may be calculated by the formula Performance*Availability*Quality. These calculations are performed "on-demand" via user query or on schedule basis (instead of being pre-calculated). Likewise, all other calculations could be performed "on-demand" via user query or on schedule basis. The calculated Availability, Performance, and Quality varies for different assets. In certain embodiments, the dashboard visualization component 120 may be configured to render dashboard visualization 328 of the calculated OEE 326 on the display device which can help in building higher level business insights and analytics. The dashboard visualization 328 offers the ability to drill down from top levels to lowest level transactions that led to the metric. It is important to note that many variations of these drill-down capabilities can be created specific to the business needs of the organization. The interactive front end dashboard visualization 328 according to various embodiments may be able to provide high-level overview of key performance indicators like the number of data loads, number of rows written, average load time, failed data loads, job status and job statistics for each run, error data, amount of data stored, etc.

OEE is an effective metric using which important insights can be gained on how to systematically improve the manufacturing process. The OEE is a measure of how well a manufacturing operation is utilized (facilities, time and material) compared to its full potential, during the periods when it is scheduled to run. OEE identifies the percentage of manufacturing time that is truly productive. An OEE of 100% means that only good parts are produced (100% quality), at the maximum speed (100% performance), and without interruption (100% availability).

Figure 4:
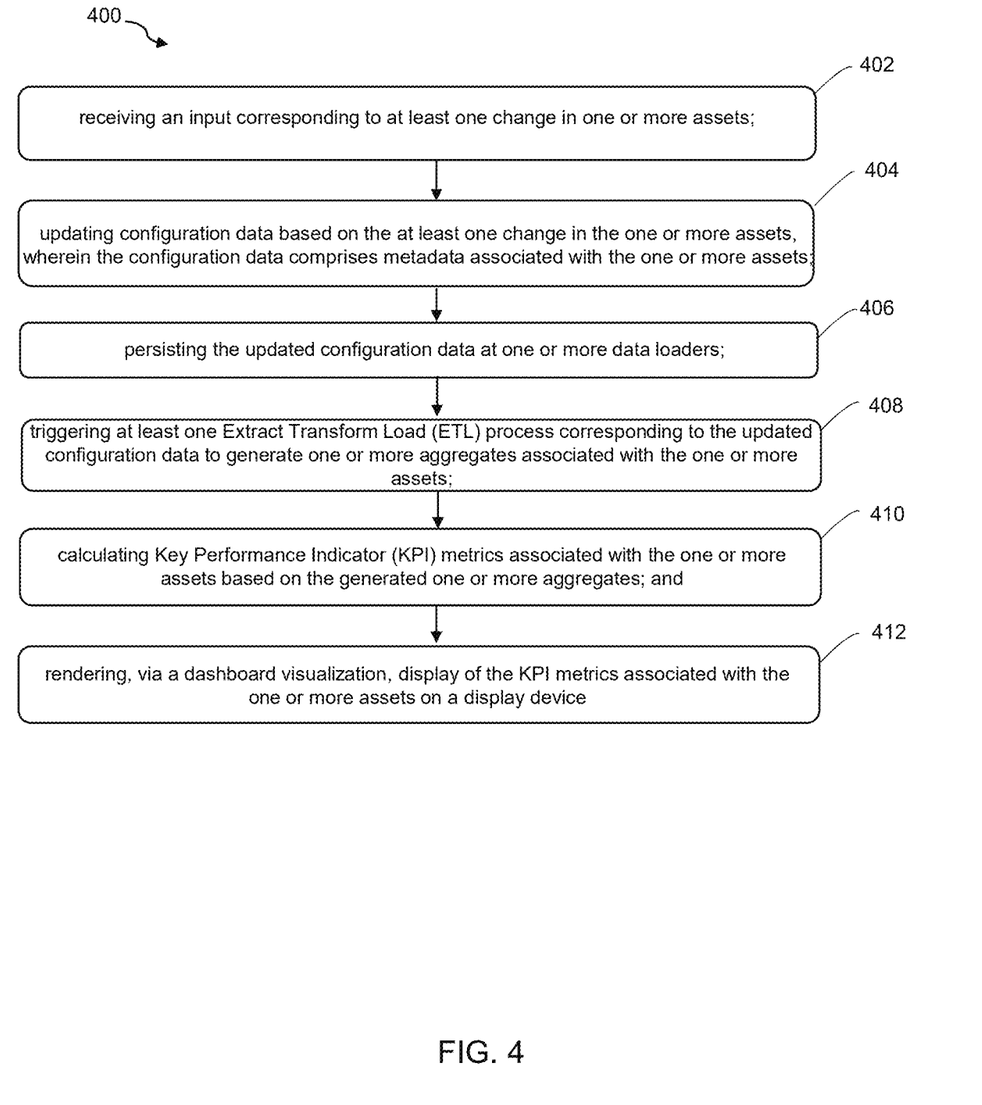
FIG. 4 illustrates a flowchart 400 showing a method in accordance with an aspect of the present disclosure.

FIG. 4 illustrates a flowchart 400 showing a method in accordance with an aspect of the present disclosure. At step 402, receiving, by the processor 106 of the data processing system 130, an input corresponding to at least one change in one or more assets. At step 404, updating, by the processor 106, the configuration data based on the at least one change in the one or more assets, wherein the configuration data comprises metadata associated with the one or more assets. At step 406, persisting, by the processor 106, the updated configuration data at one or more data loaders. At step 408, triggering, by the processor 106, at least one Extract Transform Load (ETL) process corresponding to the updated configuration data to generate one or more aggregates associated with the one or more assets. At step 410, calculating, by the processor 106, Key Performance Indicator (KPI) metrics associated with the one or more assets based on the generated one or more aggregates. At step 410, rendering, by the processor 106 via a dashboard visualization, display of the KPI metrics associated with the one or more assets on a display device.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments, a storage system or other management entity within the artificial intelligence and machine learning infrastructure may also implement automated training with continuous learning based on new data.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A system, comprising:
a processor; and
a memory storing program instructions which, when executed by the processor,
cause the processor to:
receive an input corresponding to at least one change in one or more assets;
update configuration data based on the at least one change in the one or more assets, wherein the configuration data comprises metadata associated with the one or more assets;
persist the updated configuration data at one or more data loaders;
trigger at least one Extract Transform Load (ETL) process corresponding to the updated configuration data to generate one or more aggregates associated with the one or more assets, wherein the generated one or more aggregates is associated with at least one of asset heath, asset fault, and asset performance;
wherein the ETL process is triggered at a specific frequency;
calculate Key Performance Indicator (KPI) metrics associated with the one or more assets based on the generated one or more aggregates;
populate a plurality of dimension tables with the generated dimensions associated with the one or more assets;
populate at least one fact table with the generated one or more aggregates associated with the one or more assets;
wherein the generated one or more aggregates is associated with at least one of asset heath, asset fault, and asset performance; and
render, via a dashboard visualization, display of the KPI metrics associated with the one or more assets on a display device.

2. The system of claim 1, wherein the metadata comprises at least one of asset identification data, asset type data, asset operation data, and asset location data.

3. The system of claim 1, wherein the configuration data further comprises ontology model data, the ontology model data comprising at least one of:
relationship among the one or more assets; and
relationship between at least one asset of the one or more assets and at least one facility of a plurality of facilities.

4. The system of claim 1, wherein the at least one change in the one or more assets comprises at least one of addition of new asset, addition of new data format corresponding to the one or more assets, and modification of the one or more assets.

5. The system of claim 1, wherein the memory storing program instructions which, when executed by the processor, further cause the processor to normalize the updated configuration data at the one or more data loaders.

6. The system of claim 1, wherein the memory storing program instructions which, when executed by the processor, further cause the processor to generate dimensions associated with the one or more assets based on the at least one ETL process, and wherein the generated dimensions comprise at least one of an asset space, an asset type, an asset identity (ID), and an asset location.

7. The system of claim 1, wherein the KPI metrics comprises a value of an overall equipment efficiency (OEE) of the one or more assets.

8. A method, comprising:
receiving an input corresponding to at least one change in one or more assets;
updating configuration data based on the at least one change in the one or more assets, wherein the configuration data comprises metadata associated with the one or more assets;
persisting the updated configuration data at one or more data loaders;
triggering at least one Extract Transform Load (ETL) process corresponding to the updated configuration data to generate one or more aggregates associated with the one or more assets, wherein the generated one or more aggregates is associated with at least one of asset heath, asset fault, and asset performance;
wherein the ETL process is triggered at a specific frequency;
calculating Key Performance Indicator (KPI) metrics associated with the one or more assets based on the generated one or more aggregates;
populate a plurality of dimension tables with the generated dimensions associated with the one or more assets;
populate at least one fact table with the generated one or more aggregates associated with the one or more assets;
wherein the generated one or more aggregates is associated with at least one of asset heath, asset fault, and asset performance; and
rendering, via a dashboard visualization, display of the KPI metrics associated with the one or more assets on a display device.

9. The method of claim 8, wherein the metadata comprises at least one of asset identification data, asset type data, asset operation data, and asset location data.

10. The method of claim 8, wherein the configuration data further comprises ontology model data, the ontology model data comprising at least one of:
relationship among the one or more assets; and
relationship between at least one asset of the one or more assets and at least one facility of a plurality of facilities.

11. The method of claim 8, wherein the at least one change in the one or more assets comprises at least one of addition of new asset, addition of new data format corresponding to the one or more assets, and modification of the one or more assets.

12. The method of claim 8, further comprising normalizing the updated configuration data at the one or more data loaders.

13. The method of claim 8, further comprising generating dimensions associated with the one or more assets based on the at least one ETL process, and wherein the generated dimensions comprise at least one of an asset space, an asset type, an asset identity (ID), and an asset location.

14. The method of claim 8, wherein the KPI metrics comprises a value of an overall equipment efficiency (OEE) of the one or more assets.

* * * * *